United States Patent
Song et al.

(10) Patent No.: US 10,613,019 B2
(45) Date of Patent: Apr. 7, 2020

(54) ADHESION STRENGTH TEST JIG AND ADJUSTING ROD THEREOF

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Yanlin Song, Beijing (CN); Yue Li, Beijing (CN); Haitao Liu, Beijing (CN); Dacheng Deng, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 140 days.

(21) Appl. No.: 15/771,712

(22) PCT Filed: Nov. 15, 2017

(86) PCT No.: PCT/CN2017/111063
§ 371 (c)(1),
(2) Date: Apr. 27, 2018

(87) PCT Pub. No.: WO2018/157623
PCT Pub. Date: Sep. 7, 2018

(65) Prior Publication Data
US 2019/0079000 A1 Mar. 14, 2019

(30) Foreign Application Priority Data
Mar. 1, 2017 (CN) .......................... 2017 1 0116663

(51) Int. Cl.
*G01N 19/04* (2006.01)
*G02F 1/13* (2006.01)

(52) U.S. Cl.
CPC ..... *G01N 19/04* (2013.01); *G01N 2203/0091* (2013.01); *G01N 2203/0405* (2013.01); *G02F 1/1309* (2013.01)

(58) Field of Classification Search
CPC ....................................................... G01N 19/04
(Continued)

(56) References Cited

U.S. PATENT DOCUMENTS 4,332,366 A * 6/1982 Descals Munt .......... B23Q 1/03
248/172
9,952,130 B2 4/2018 Wang et al.
(Continued)

FOREIGN PATENT DOCUMENTS

CN 103470930 A 12/2013
CN 104251766 A 12/2014
(Continued)

OTHER PUBLICATIONS

International Search Report and Written Opinion, including English translation of Box V of the Written Opinion, for International Application No. PCT/CN2017/111063, dated Feb. 2, 2018, 14 pages.

*Primary Examiner* — Nimeshkumar D Patel
*Assistant Examiner* — Jean F Morello
(74) *Attorney, Agent, or Firm* — Westman, Champlin & Koehler, P.A.

(57) ABSTRACT

The present disclosure provides an adhesion strength test jig includes a plurality of adjusting rods which are connected in an end-to-end manner so as to define an accommodating space for accommodating an adhered element. Each of the adjusting rods includes a rod body and a sliding block located at one end of the rod body, and the sliding block of each of the adjusting rods is capable of sliding along the rod (Continued)

body of another adjusting rod connected thereto, so as to adjust a size of the accommodating space.

19 Claims, 3 Drawing Sheets

(58) Field of Classification Search
USPC .................................................... 73/150 R
See application file for complete search history.

(56) References Cited

U.S. PATENT DOCUMENTS

2016/0084745 A1   3/2016  Wang et al.
2016/0334653 A1   11/2016 Xue et al.

FOREIGN PATENT DOCUMENTS

| CN | 105509984 A | 4/2016 |
| CN | 106297052 A | 1/2017 |

* cited by examiner

ADHESION STRENGTH TEST JIG AND ADJUSTING ROD THEREOF

CROSS-REFERENCE TO RELATED APPLICATION

The present application is the U.S. national phase of PCT application NO. PCT/CN2017/111063, filed on Nov. 15, 2017, which claims priority to Chinese patent application No. 201710116663.3 filed on Mar. 1, 2017, the disclosure of which is incorporated herein in its entirety by reference.

TECHNICAL FIELD

The present disclosure relates to the field of display technology, and more particularly to an adhesion strength test jig and an adjusting rod thereof.

BACKGROUND

With the social demand has entered into information age, there is a great demand for information display. Currently, liquid crystal display is the most commonly used displaying method in the market, liquid crystal display device controls rotation of liquid crystals using electric field to realize grayscale display and further realize color display by means of color filter, which device has excellent performances of being thin, lightweight, low power consumption etc., and has already been applied in the field of computer, television and mobile terminal devices.

For full lamination products in related art, taking touch screen as an example, which is formed by adhering a LCM (LCD Module) and a TP (touch panel) together, there are two ways for the adhesion of the TP and the LCM, i.e., full lamination and edge lamination. The full lamination method bonds the TP and the LCM together by the entire surfaces thereof using optically clear adhesive (OCA) or optical clear resin (OCR). During assembling process of the touch screen, an adhesive peeling-off phenomenon may possibly occurs, it is therefore needs a test on adhesion strength of the product to provide data support for its anti-peeling property.

In the related art, a jig is usually used to fix a substrate, and by cooperating with a force sensor, a judgment may be made on the adhesion strength of the product. However, when using the adhesion strength test jigs in the related art to run the adhesion strength tests for different sizes of touch screens, different test jigs are needed, therefore reducing the versatility.

SUMMARY

The present disclosure provides an adhesion strength test jig includes a plurality of adjusting rods. The plurality of adjusting rods is connected in an end-to-end manner so as to define an accommodating space for accommodating an adhered element. Each of the adjusting rods includes a rod body and a sliding block, and the sliding block is located at one end of the rod body. The sliding block of each of the adjusting rods is capable of sliding along the rod body of another adjusting rod connected thereto, so as to adjust a size of the accommodating space.

Furthermore, the sliding block of each of the adjusting rods has a hollowed-out portion, and the rod body of another adjusting rod connected thereto is received in the hollowed-out portion.

Furthermore, the sliding block of each of the adjusting rods is a hollowed-out frame structure, and is sleeved onto the rod body of another adjusting rod connected thereto.

Furthermore, the rod body of each of the adjusting rods is provided at a side surface with a groove extending in an axial direction of the rod body, and an inner wall of the sliding block of each of the adjusting rods defining the hollowed-out portion is provided with a protrusion. The protrusion on the sliding block of each of the adjusting rods is fitted into the groove of another adjusting rod connected thereto, and is capable of sliding in the groove of the another adjusting rod.

Furthermore, the protrusion is a block-like structure whose cross section is of a trapezoidal shape, and an end-face area of an end of the protrusion towards the groove is less than that of another end of the protrusion connected to the sliding block, and the groove is a trapezoidal groove structure whose trapezoidal cross section matches the structure of the protrusion.

Furthermore, an inner side of the rod body of at least one of the plurality of adjusting rods has a stepped structure, a step surface of the stepped structure is installed with a plurality of supporting blocks, and the plurality of supporting blocks is detachably arranged in sequence on the rod body along an axial direction of the rod body.

Furthermore, a width of each of the supporting blocks in the axial direction of the rod body on which the supporting blocks are located is less than 5 mm.

Furthermore, the supporting blocks are detachably installed on the step surface on the inner side of the rod body on which the supporting blocks are located by bolts.

Furthermore, one end of each of the bolts penetrates through each of the supporting blocks so as to be screwed into the step surface, and the other end thereof does not exceed an external surface of a side of each of the supporting blocks away from the step surface.

Furthermore, the supporting blocks are cubes made of stainless steel, and the bolts are made of stainless steel.

Furthermore, on the adjusting rod having the stepped structure, the sliding block is spaced apart from the supporting blocks and the stepped structure.

Furthermore, the adhesion strength test jig includes four adjusting rods.

Furthermore, the four adjusting rods include a first adjusting rod, a second adjusting rod, a third adjusting rod and a fourth adjusting rod; wherein the sliding block of the first adjusting rod is movably connected to the rod body of the second adjusting rod; the sliding block of the second adjusting rod is movably connected to the rod body of the third adjusting rod; the sliding block of the third adjusting rod is movably connected to the rod body of the fourth adjusting rod; and the sliding block of the fourth adjusting rod is movably connected to the rod body of the first adjusting rod.

The embodiment of the present disclosure further provides an adhesion strength test jig includes a plurality of adjusting rods connected in an end-to-end manner to form a ring and define an accommodating space for accommodating an adhered element. Each of the adjusting rods includes a rod body and a sliding block located at one end of the rod body, every two adjacent adjusting rods comprise a first adjusting rod and a second adjusting rod, and the sliding block of the first adjusting rod is slidably arranged on the rod body of the second adjusting rod, so as to adjust a size of the accommodating space.

Furthermore, the plurality of adjusting rods is connected in an end-to-end manner so as to form a rectangular ring.

Furthermore, the sliding block of each of the adjusting rods has a hollowed-out portion, and the rod body of the second adjusting rod is received in the hollowed-out portion of the first adjusting rod.

Furthermore, the rod body of each of the adjusting rods is provided at a side surface with a groove extending in an axial direction of the rod body of each of the adjusting rods, and an inner wall of the sliding block of each of the adjusting rods defining the hollowed-out portion is provided with a protrusion. The protrusion on the sliding block of the first adjusting rod is slidably installed in the groove of the second adjusting rod.

Furthermore, the protrusion of the first adjusting rod is a block-like structure whose cross section is of a trapezoidal shape, and an end-face area of an end of the protrusion of the first adjusting rod towards the groove of the second adjusting rod is less than that of another end of the protrusion of the first adjusting rod connected to the sliding block of the first adjusting rod; and the groove of the second adjusting rod is a trapezoidal groove structure whose trapezoidal cross section matches the structure of the protrusion of the first adjusting rod.

Furthermore, the sliding block of each of the adjusting rods is a hollowed-out frame structure, and the sliding block of the first adjusting rod is slidably sleeved onto the rod body of the second adjusting rod.

The embodiment of the present disclosure further provides an adjusting rod includes a rod body and a sliding block arranged at one end of the rod body. The sliding block has a hollowed-out portion, an inner wall of the sliding block defining the hollowed-out portion is provided with a protrusion, and the rod body is provided at a side surface with a groove extending in an axial direction of the rod body.

Furthermore, the protrusion is a block-like structure whose cross section is of a trapezoidal shape, and the groove is a trapezoidal groove structure.

DETAILED DESCRIPTION

Principles and features of the present disclosure will be described hereinafter in conjunction with the drawings, and the described examples are merely used to explain, rather than to limit, the scope of the present disclosure.

For the above mentioned technical problem in the related art of poor versatility of the test jig used for testing the adhesion strength of an adhered element such as touch screen or others, the present disclosure provides an adhesion strength test jig capable of conducting adhesion strength tests for different sizes of products.

The adhesion strength test jig provided in an embodiment of the present disclosure is configured to test the adhesion strength within an adhered element, wherein the adhered element includes a first component and a second component adhered with each other.

Figure 1:
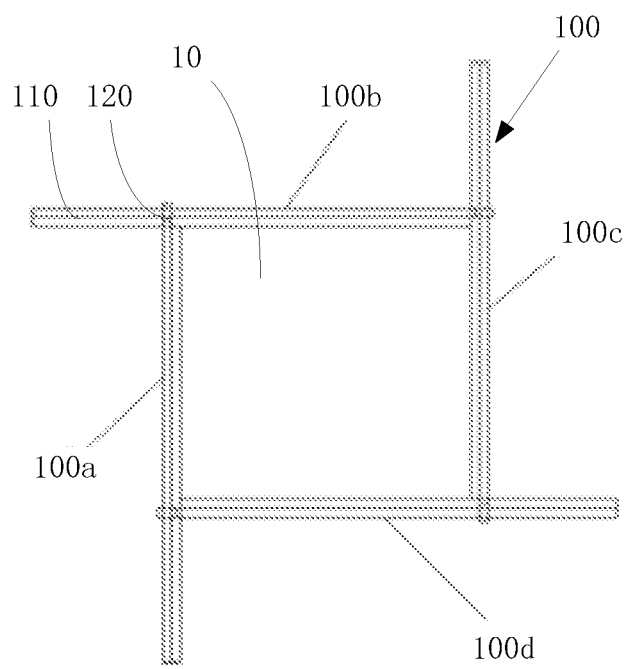
FIG. 1 shows a schematic view of the overall structure of an adhesion strength test jig provided in an embodiment of the present disclosure.
Figure 2:
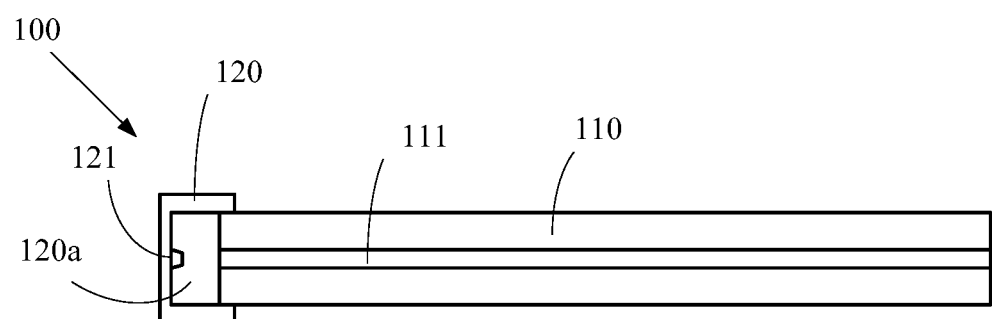
FIG. 2 shows an enlarged schematic view of an adjusting rod of the adhesion strength test jig provided in the embodiment of the present disclosure.

As shown in FIG. 1 and FIG. 2, the adhesion strength test jig includes a plurality of adjusting rods 100, which are connected in an end-to-end manner so as to form an accommodating space 10 for accommodating the adhered element, wherein each of the adjusting rods 100 includes a rod body 110 and a sliding block 120, the sliding block 120 is located at one end of the rod body 110 and is capable of sliding along the rod body 110 of another adjusting rod 100 connected thereto, so as to adjust a size of the accommodating space 10.

The plurality of adjusting rods 100 of the adhesion strength test jig according to the present disclosure are capable of forming an accommodating space 10 which shape is corresponding to that of an adhered element to be tested (for example a touch screen), and since the sliding block 120 at the end of each of the adjusting rods 100 is capable of sliding on the rod body 110 of another adjusting rod 100 connected thereto, the plurality of adjusting rods 100 may perform several continuously size adjustments to their enclosure based on the size of the adhered element to be tested by cooperation between the sliding blocks 120 and the rod bodies 110, so as to change the size of the accommodating space 10, thus enabling adhesion strength tests for different types of adhered elements, which is easy to operate. In particular, in the case that the adhesion strength test jig provided by the present disclosure is applied in adhesion strength tests for touch screens, it is capable of conducting tests on adhesion strength for different sizes of products, thus solving the technical problem where specialized test jigs are respectively needed for conducting adhesion strength tests for different types of touch screens, improving the poor versatility of the test jig in the related art, as well as filling up the gap of versatile jig for this type of test.

It is noted that the adhesion strength test jig provided in the present disclosure is an adhesion strength jig suitable for various adhered elements; in particular, it is usable for adhesion strength tests for touch screens. The adhesion strength test jig provided in the embodiment of the present disclosure will be described hereinafter in more detail by only taking a case where the test jig is used for testing the adhesion strength of a touch screen as an example.

It should be understood that, when the adhesion strength test jig is used for the adhesion strength test of a touch screen, the jig is usually adopted to fix a display module of the touch screen, that is, the first component generally refers to the display module of the touch screen, for instance, a liquid crystal display module, and The second component generally refers to a touch panel of the touch screen. Of course, in practical use, the present disclosure is not limited thereto.

In the embodiment provided by the present disclosure, optionally, as shown in FIG. 1, there are four adjusting rods 100, that is, a first adjusting rod 100a, a second adjusting rod 100b, a third adjusting rod 100c and a fourth adjusting rod 100d, wherein a sliding block 120 of the first adjusting rod 100a is movably connected to a rod body of the second adjusting rod 100b; a sliding block 120 of the second adjusting rod 100b is movably connected to a rod body of the third adjusting rod 100c; a sliding block 120 of the third adjusting rod 100c is movably connected to a rod body of the fourth adjusting rod 100d; and a sliding block 120 of the fourth adjusting rod 100d is movably connected to a rod body of the first adjusting rod 100a.

It should be understood that, in practical use, the specific number of the adjusting rods 100 may be adjusted according to practical needs.

Figure 3:
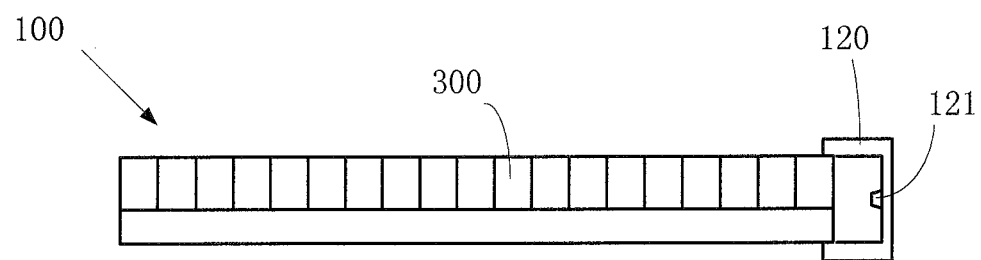
FIG. 3 is a schematic view of the adjusting rod in FIG. 2 viewed from another angle.
Figure 4:
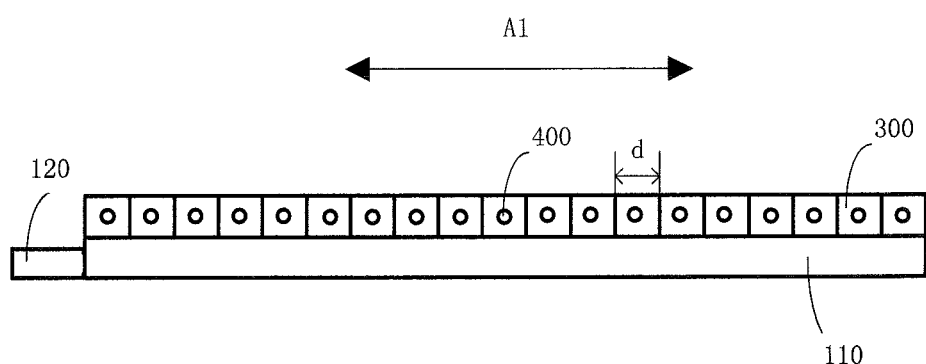
FIG. 4 is a top view of the adjusting rod in FIG. 2.
Figure 5:
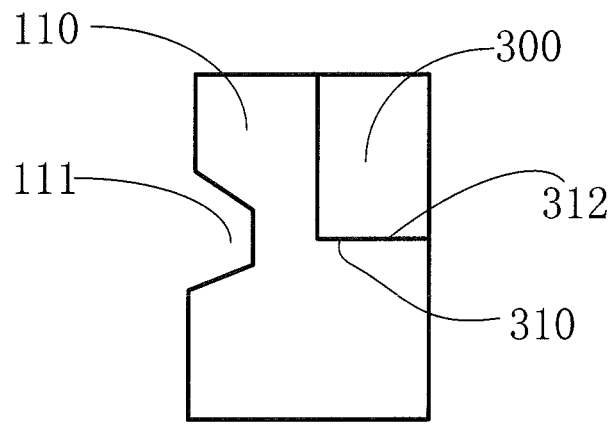
FIG. 5 is a schematic view of a cross sectional structure of a rod body of the adjusting rod in FIG. 2.

FIG. 2 shows an enlarged schematic view of the adjusting rod of the adhesion strength test jig provided in the embodiment of the present disclosure. FIG. 3 is a schematic view of the adjusting rod in FIG. 2 seen from another angle. FIG. 4 is a top view of the adjusting rod in FIG. 2. FIG. 5 is a schematic view of a cross sectional structure of the rod body of the adjusting rod in FIG. 2.

As shown in FIG. 2 to FIG. 5, in the embodiment provided by the present disclosure, optionally, the sliding block 120 of each of the adjusting rods 100 has a hollowed-out portion 120a, and the rod body 110 of another adjusting rod 100 connected thereto is accommodated in the hollowed-out portion 120a.

In the above solution, among the plurality of adjusting rods 100, the cooperation between the sliding block 120 and the rod body 110 is realized by using the inside of the hollowed-out portion 120a of the sliding block 120 of each of the adjusting rods 100 accommodates the rod body 110 of another adjusting rod 100 connected thereto, so as to establish a connection between the sliding block 120 and the rod body 110. Which structure is simple, and size adjustment on the accommodating space 10 enclosed by the plurality of sliding rods is realized by moving the sliding blocks 120 according to a dimension of the touch screen.

In addition, as shown in FIG. 1 to FIG. 5, in the embodiment provided by the present disclosure, optionally, the sliding block 120 of each of the adjusting rods 100 is a hollowed-out frame structure, and sleeved onto the rod body 110 of another adjusting rod 100 connected thereto.

By adopting the above solution, the sliding block 120 is designed into a hollowed-out frame structure, and optionally, as shown in FIG. 2, the sliding block 120 is a closed ring-shaped frame structure, for instance, a rectangular frame structure etc., so as to realize a sliding connection by putting the sliding block 120 on the rod body 110, and such a way of cooperation is much stronger.

It should be understood that, in practical use, the sliding block 120 may also be designed into other structures, as long as the sliding block 120 is designed with the hollowed-out portion 120a, for example, the sliding block 120 is a half ring-shaped frame structure etc. However, it should be noted that, as compared with the sliding block 120 designed into a half ring-shaped frame structure, the sliding block 120 designed into a hollowed, closed ring-shaped frame structure is less prone to being separated from the rod body 110, and more beneficial to the stability of the whole jig structure.

In the embodiment provided by the present disclosure, optionally, as shown in FIG. 2 to FIG. 5, the rod body 110 of each of the adjusting rods 100 is provided at a side surface with a groove 111 extending in an axial direction of the rod body 110, and an inner wall of the sliding block 120 of each of the adjusting rods 100 defining the hollowed-out portion 120a is provided with a protrusion 121; wherein the protrusion 121 on the sliding block 120 of each of the adjusting rods is fitted into the groove 111 of another adjusting rod 100 connected thereto, and is capable of sliding in the groove 111 of the another adjusting rod 100.

By adopting the above solution in which the groove 111 is arranged in the rod body 110 of the adjusting rod 100 and the protrusion 121 is arranged on the inner wall of the sliding block 120 defining the hollowed-out portion 120a, the cooperation between the groove 111 and the protrusion 121 enables the sliding block 120 to slide along the rod body 110 more stably and smoothly, which improves the stability of the jig.

It should be noted that, optionally, the groove 111 is arranged at an outer side of the rod body 110, the outer side is a side opposite to the inner side of the rod body 110 forming the accommodating space, and accordingly, the protrusion 121 is arranged on the inner wall of the sliding block 120 corresponding to the outer side defines the hollowed-out portion 120a. It should be understood that, the specific arranging locations of the protrusion 121 and the groove 111 are not limited.

In addition, in the embodiment provided by the present disclosure, optionally, as shown in FIG. 2 to FIG. 5, the protrusion 121 is a block-like structure whose cross section is of a trapezoidal shape, an end-face area of an end of the protrusion 121 towards the groove 111 is less than that of another end of the protrusion 121 connected to the sliding block 120, and the groove 111 is a trapezoidal groove structure whose trapezoidal cross section matches the structure of the protrusion 121.

By adopting the above solution in which the protrusion 121 is designed into a trapezoidal structure and the groove 111 is designed into an inverted trapezoidal structure cooperated with the structure of the protrusion 121, the cooperation between the protrusion 121 and the groove 111 may enhance the stability of the structure, and enable the block 120 to slide more smoothly. As a matter of course, it may be appreciated that there is no limitation on the specific structures of the protrusion 121 and the groove 111.

In addition, in the case that one or some of the edges of the first component of the adhered element are provided with one or more lug portions, for example, one or some of the edges of the display module are assembled with one or more lug portions in the case of a touch screen, in order to avoid interference between the lug portion(s) and the adhesion strength test jig, in the embodiment provided by the present disclosure, optionally, as shown in FIG. 2 to FIG. 5, an inner side of the rod body 110 of at least one of the adjusting rods 100 has a stepped structure 310, a step surface 312 thereof is installed with a plurality of supporting blocks 300, and the plurality of supporting blocks 300 is detachably arranged in sequence on the rod body 110 along an axial direction of the rod body 110 (e.g., as shown by the arrow A1 in FIG. 4), so that the supporting block(s) 300 corresponding to the location(s) of the lug portion(s) at the edge of the first component may be detached to make space for the lug portion(s).

By adopting the above solution, since an ordinary liquid crystal display module is always assembled with lug portion(s), when the adhesion strength test jig is used for conducing the adhesion strength test, in accordance with the location(s) of the lug portion(s) on the liquid crystal display module, the supporting block(s) 300 at corresponding location(s) may be removed, thus preventing the interference from being generated to affect the test, while other supporting blocks 300 at other locations are still used for supporting the edge(s) of the liquid crystal display module.

The smaller width of the supporting blocks 300 in the axial direction of the rod body 110 on which the supporting block 300s are located, the more accurate the experimental simulation, and optionally, the width d of each of the supporting blocks 300 in the axial direction of the rod body 110 on which the supporting blocks 300 are located is less than 5 mm.

In addition, optionally, the supporting blocks 300 are detachably installed on the step surface 312 of the inner side of the rod body 110 by bolts 400.

By adopting the above solution in which the supporting blocks 300 are screwed to the rod body 110 by the bolts, it is convenient for disassembling and assembling. It should be understood that, in practical use, the supporting blocks 300 may also be detachably installed on the rod body 110 by other methods, which are not limited herein.

Figure 6:
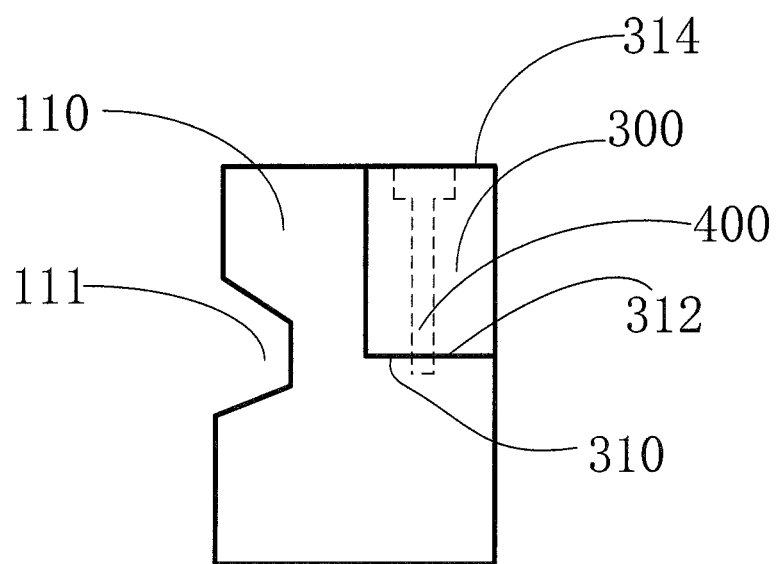
FIG. 6 is a schematic view of another cross sectional structure of the rod body of the adjusting rod in FIG. 2, showing a connection relationship between a bolt and a supporting block.

In addition, optionally, as shown in FIG. 4 and FIG. 6, one end of each of the bolts 400 penetrates through each of the supporting blocks 300 so as to be screwed into the step surface, and the other end thereof does not exceed an external surface 314 on a side of the supporting block 300 away from the step surface.

By adopting the above solution, the bolts 400 is located above the supporting blocks 300, however, the accommodation space enclosed by the adjusting rods 100 is configured to accommodate the display module, and size of the touch panel is usually slightly bigger than that of the display module, so that the touch panel will be supported by an upper side of the adjusting rod 100, therefore, in the above solution, the bolt 400 should not protrude from a supporting surface of the adjusting rod 100 for supporting the touch panel.

In addition, in respect of the material used for the supporting blocks 300 and the bolts, comprehensively considering factors of the adhesion strength test jig such as the stability of its main body structure and the possibility that the bolts and the supporting blocks 300 may come in contact with hands of the operator etc., for a purpose of wear-resisting and preventing sweat corrosion, optionally, the supporting blocks 300 are cubes made of stainless steel, and the bolts are made of stainless steel.

In addition, as shown in FIG. 1 and FIG. 4, in the same adjusting rod 100, the sliding block 120 is located at one end of the rod body 110, and is spaced apart from the supporting blocks 300 and the stepped structure. In other words, the sliding block 120 does not come into contact with the supporting blocks 300 as well as the stepped structure.

The above are merely the optional embodiments of the present disclosure, and it should be noted that, improvements and modifications will be made by a person skilled in the art without departing from the principles of the present disclosure, and these improvements and modifications shall also fall within the protection scope of the present disclosure.

What is claimed is:

1. An adhesion strength test jig comprising a plurality of adjusting rods,
    wherein the plurality of adjusting rods is connected in an end-to-end manner, so as to define an accommodating space for accommodating an adhered element;
    wherein each of the adjusting rods comprises a rod body and a sliding block, and the sliding block is located at one end of the rod body and is capable of sliding along the rod body of another adjusting rod connected thereto, so as to adjust a size of the accommodating space,
    wherein an inner side of the rod body of at least one of the adjusting rods has a stepped structure, a step surface of the stepped structure is installed with a plurality of supporting blocks, and the plurality of supporting blocks is detachably arranged in sequence on the rod body along an axial direction of the rod body.

2. The adhesion strength test jig according to claim 1, wherein the sliding block of each of the adjusting rods has a hollowed-out portion, and the rod body of another adjusting rod connected thereto is received in the hollowed-out portion.

3. The adhesion strength test jig according to claim 2, wherein the sliding block of each of the adjusting rods is a hollowed-out frame structure, and sleeved onto the rod body of another adjusting rod connected thereto.

4. The adhesion strength test jig according to claim 2, wherein the rod body of each of the adjusting rods is provided at a side surface with a groove extending in an axial direction of the rod body, and an inner wall of the sliding block of each of the adjusting rods defining the hollowed-out portion is provided with a protrusion;
    wherein the protrusion on the sliding block of each of the adjusting rods is fitted into the groove of another adjusting rod connected thereto, and is capable of sliding in the groove of the another adjusting rod.

5. The adhesion strength test jig according to claim 4, wherein the protrusion is a block-like structure whose cross section is of a trapezoidal shape, and an end-face area of an end of the protrusion towards the groove is less than that of another end of the protrusion connected to the sliding block, and the groove is a trapezoidal groove structure whose trapezoidal cross section matches the structure of the protrusion.

6. The adhesion strength test jig according to claim 1, wherein a width of each of the supporting blocks in the axial direction of the rod body on which the supporting blocks are located is less than 5 mm.

7. The adhesion strength test jig according to claim 1, wherein the supporting blocks are detachably installed on the step surface on the inner side of the rod body on which the supporting blocks are located by bolts.

8. The adhesion strength test jig according to claim 7, wherein one end of each of the bolts penetrates through each of the supporting blocks so as to be screwed into the step surface, and the other end thereof does not exceed an external surface of a side of each of the supporting blocks away from the step surface.

9. The adhesion strength test jig according to claim 1, wherein on the adjusting rod having the stepped structure, the sliding block is spaced apart from the supporting blocks and the stepped structure.

10. The adhesion strength test jig according to claim 1, wherein the adhesion strength test jig comprises four adjusting rods.

11. The adhesion strength test jig according to claim 10, wherein the four adjusting rods comprise a first adjusting rod, a second adjusting rod, a third adjusting rod and a fourth adjusting rod; wherein the sliding block of the first adjusting rod is movably connected to the rod body of the second adjusting rod; the sliding block of the second adjusting rod is movably connected to the rod body of the third adjusting rod; the sliding block of the third adjusting rod is movably connected to the rod body of the fourth adjusting rod; and the sliding block of the fourth adjusting rod is movably connected to the rod body of the first adjusting rod.

12. An adhesion strength test jig, comprising a plurality of adjusting rods connected in an end-to-end manner to form a ring and define an accommodating space for accommodating an adhered element;
    wherein each of the adjusting rods comprises a rod body and a sliding block located at one end of the rod body; every two adjacent adjusting rods comprise a first adjusting rod and a second adjusting rod, and the sliding block of the first adjusting rod is slidably arranged on the rod body of the second adjusting rod, so as to adjust a size of the accommodating space,
    wherein an inner side of the rod body of at least one of the adjusting rods has a stepped structure, a step surface of the stepped structure is installed with a plurality of supporting blocks, and the plurality of supporting blocks is detachably arranged in sequence on the rod body along an axial direction of the rod body.

13. The adhesion strength test jig according to claim 12, wherein the plurality of adjusting rods is connected in an end-to-end manner so as to form a rectangular ring.

14. The adhesion strength test jig according to claim 12, wherein the sliding block of each of the adjusting rods has a hollowed-out portion, and the rod body of the second adjusting rod is received in the hollowed-out portion of the first adjusting rod.

15. The adhesion strength test jig according to claim 14, wherein the rod body of each of the adjusting rods is provided at a side surface with a groove extending in an axial direction of the rod body of each of the adjusting rods, and an inner wall of the sliding block of each of the adjusting rods defining the hollowed-out portion is provided with a protrusion;
wherein the protrusion on the sliding block of the first adjusting rod is slidably installed in the groove of the second adjusting rod.

16. The adhesion strength test jig according to claim 15, wherein the protrusion of the first adjusting rod is a block-like structure whose cross section is of a trapezoidal shape, and an end-face area of an end of the protrusion of the first adjusting rod towards the groove of the second adjusting rod is less than that of another end of the protrusion of the first adjusting rod connected to the sliding block of the first adjusting rod; and the groove of the second adjusting rod is a trapezoidal groove structure whose trapezoidal cross section matches the structure of the protrusion of the first adjusting rod.

17. The adhesion strength test jig according to claim 12, wherein the sliding block of each of the adjusting rods is a hollowed-out frame structure, and the sliding block of the first adjusting rod is slidably sleeved onto the rod body of the second adjusting rod.

18. An adjusting rod, comprising:
a rod body; and
a sliding block arranged at one end of the rod body;
wherein the sliding block has a hollowed-out portion, an inner wall of the sliding block defining the hollowed-out portion is provided with a protrusion, and the rod body is provided at a side surface with a groove extending in an axial direction of the rod body,
wherein an inner side of the rod body has a stepped structure, a step surface of the stepped structure is installed with a plurality of supporting blocks, and the plurality of supporting blocks is detachably arranged in sequence on the rod body along an axial direction of the rod body.

19. The adjusting rod according to claim 18, wherein the protrusion is a block-like structure whose cross section is of a trapezoidal shape; and the groove is a trapezoidal groove structure.

* * * * *